Nov. 28, 1933.  W. C. PITTER  1,937,127

VARIABLE SPEED TRANSMISSION DEVICE

Filed Nov. 26, 1930  5 Sheets-Sheet 1

Inventor
Walter Charles Pitter
By Luther Johns
Atty.

Nov. 28, 1933.   W. C. PITTER   1,937,127
VARIABLE SPEED TRANSMISSION DEVICE
Filed Nov. 26, 1930   5 Sheets-Sheet 3

Inventor
Walter Charles Pitter
By Luther Johns
Atty.

Nov. 28, 1933. W. C. PITTER 1,937,127
VARIABLE SPEED TRANSMISSION DEVICE
Filed Nov. 26, 1930 5 Sheets-Sheet 4

Inventor
Walter Charles Pitter
By Luther Johns
atty

Nov. 28, 1933. W. C. PITTER 1,937,127
VARIABLE SPEED TRANSMISSION DEVICE
Filed Nov. 26, 1930   5 Sheets-Sheet 5

Inventor
Walter Charles Pitter
By Luther Johns
atty.

Patented Nov. 28, 1933

1,937,127

UNITED STATES PATENT OFFICE 1,937,127

VARIABLE SPEED TRANSMISSION DEVICE

Walter Charles Pitter, Epping, England, assignor to The Pitter Trust, Chicago, Ill., a common law trust Application November 26, 1930
Serial No. 498,210

9 Claims. (Cl. 74—53)

This invention relates to transmission mechanisms of the kind in which the output speed may be gradually varied.

The chief objects of the present invention are to provide a variable speed transmission which is highly efficient; one which has relatively few parts; one which is comparatively simple in construction; one which may be small and compact; and one which is strong and durable and adapted to withstand the strains of service. Other objects and advantages will appear hereinafter.

In the drawings Figure 1 is a medial horizontal or top plan section of a variable speed device embodying my present invention, with various parts shown in full;

Figure 2:
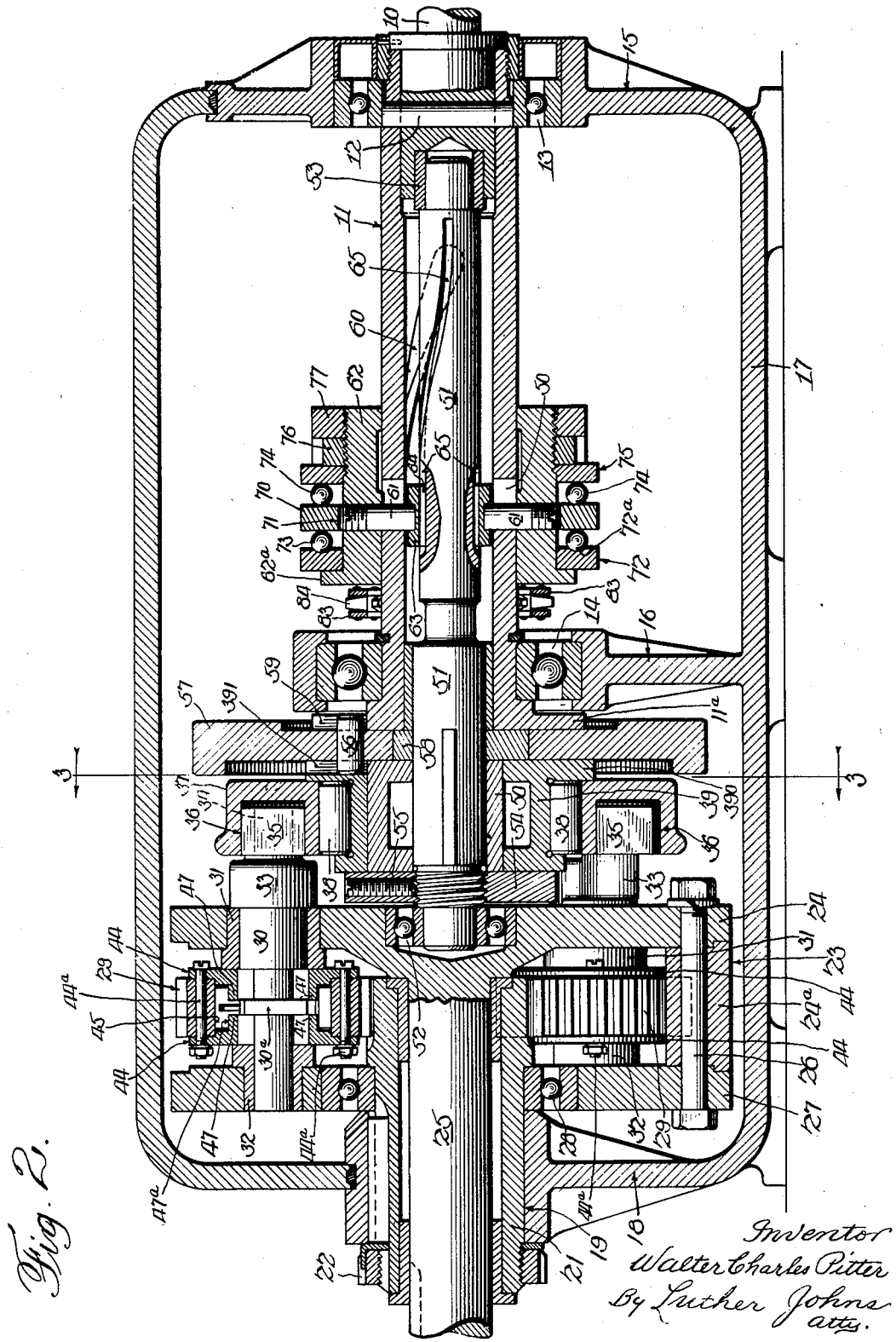
Fig. 2 is a medial vertical longitudinal section, on the line 2—2 of Fig. 1.

Referring to Fig. 2 the driving or input shaft 10 has a sleeve 11 fixed thereto and held in position by means of a transverse pin 12. The sleeve 11 is journaled at each end in bearings 13 and 14 respectively mounted in a front wall 15 and the partition wall 16 of the housing 17. Input shaft 10 carries a coaxial bearing 53 into which projects the reduced end of a shaft 51. The inner end of shaft 51 is journaled in a disc-like plate 24 through bearing 52. On the inner end portion of shaft 51 is rigidly secured a cam 50. Surrounding cam 50 is a cam 39, and surrounding cam 39 is a disc-like grooved member or plate 37.

The variation of the output speed depends upon the relative position of cams 50 and 39. By turning cams 39 relative to cam 50 the degree of radial throw or eccentric movement of the ring-like member 37 is varied. This varied movement of member 37 is communicated through crank arms and one-way clutch devices to the output shaft.

The rear wall 18 of the housing 17 has an opening 19 on the axis of input shaft 10. Sleeve 21 extends through opening 19 and is rigidly secured therein by nut 22. On sleeve 21 is the sun wheel gear 20. We have in this device a fixed sun wheel.

The output or driven shaft 25 extends rotatably through sleeve 21. At the inner end of shaft 25 is an integral circular plate or disc 24. The opposed plate or disc 27 has a bearing 28 on sleeve 21. Plates 24 and 27 are bound tightly as a unit in spaced relation by bolts 26 passing through marginal parts of the discs and the spacing blocks 24a. This rotor on output shaft 25 is marked as a whole 23.

Figure 3:
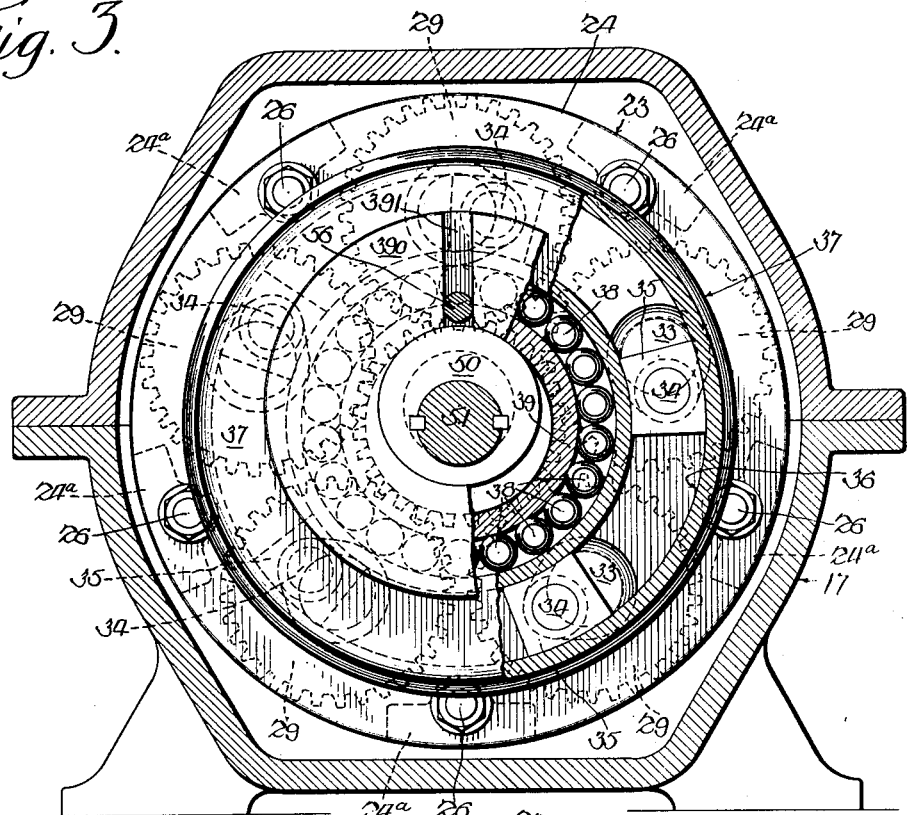
Fig. 3 is a cross section on the line 3—3 of Fig. 2, with some of the parts broken away.

Five planet wheels, each marked 29, severally mesh with sun wheel 20 and are severally mounted for rotation between the discs 24 and 27 on the several shafts 30 mounted in bearings 31 and 32 in the rotor discs 24 and 27 respectively. Each shaft 30 has a crank arm 33 on its inner end and each crank arm has a crank pin 34 extending into a block 35 (Fig. 3) which is mounted to slide in the annular way, channel or recess 36 in the circular ring-like member 37 mounted for rotation on the outer eccentric member 39 through bearing 38.

Each planet wheel 29 has a one-way clutch connection with its associated shaft 30. This clutch mechanism forms the subject matter of a copending application by Walter Charles Pitter filed July 18, 1928 as Serial No. 293,593. I shall describe this clutch device herein sufficiently to explain the construction and operation.

Between rotor discs 24 and 27 each shaft 30 has a collar-like enlargement 30a and each of these enlargements has three transversely-milled somewhat V-shaped recesses 40 (see Fig. 6) in which struts 41 are seated for swinging movement. At their outer ends these struts 41 are also seated to rock at 42a in the rear end portions of gripper levers 42. Each planet gear 29 is in the form of a ring and is held by side plates 44 and bolts 44a. The inner surface of each gear 29 is finished to cylindrical shape at 45. Each side plate 44 has inwardly-directed hub portions 47 the outer surfaces of which are finished on cylindrical lines at 47a. Each gripper lever 42 occupies the space between side plates 44, and each has a pair of gripping surfaces on its opposite sides. Gripping surface 43 is closely face to face with inner surface 45 of gear 29, while gripping surface 46 is closely face to face with gear hub surfaces 47a. A tension spring 48 is connected to the rear end of each gripper lever 42, the other end of the spring being fixed to a pin 49 in enlargement 30a of shaft 30.

Figure 6:
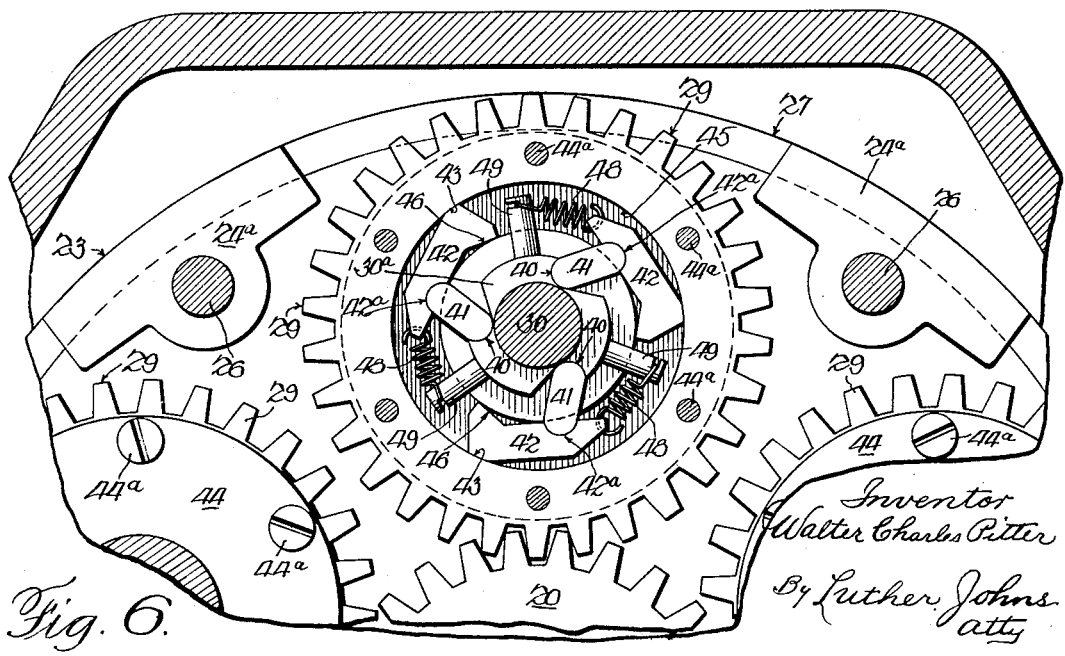
Fig. 6 is an enlarged fragmentary section showing parts of Fig. 5, with the side plate of one of the splined gears removed and showing the clutching elements in face view.

When shafts 30 are respectively driven in the clockwise direction as viewed in Fig. 6 the struts 41, which are somewhat tangentially arranged, move the rear ends of levers 42 outward causing the forward end portions of the grippers respectively to become tightly bound between surfaces 45 and 47a, thus locking a planet wheel 29 to shaft 30 and carrying the planet wheel around. Each shaft 30 rocks back and forth on its own axis. The result of the interposed clutch mechanism is that the associated planet wheel 29 is moved step by step in a given direction. The clutch operates only one way, so, when the driving force of shaft 30 is discontinued the wheel 29 may continue to turn.

I have mentioned that outer eccentric 39 is mounted on inner eccentric 50 which is keyed to shaft 51. A collar 54 is threaded upon the inner end portion of shaft 51 adjacent to the rotor side plate 24 and is securely locked in place by set screw 55. The collar 54 engages one side of the eccentrics 39 and 50 to hold them in place. The outer eccentric 39 is provided with a lateral flange 390 having a radial key slot 391 into which extends transversely a pin 56 fixed in a counterbalancing disc-like plate 57. This plate 57 is mounted on a small eccentric 58 which is secured to shaft 51. The high point of eccentric 58 is set one hundred eighty degrees from the high point of the inner eccentric 50. The other end of pin 56 extends transversely through a radial slot 59 in flange 11a of sleeve 11. Pin 56 is in fixed relation to plate 57. It is a driving element or lock between sleeve 11 and the outer cam 39. Since plate 57 is on cam 58 it moves excentrically, and slots 59 and 391 permit this movement while still maintaining sleeve 11 in driving relation to outer cam 39.

Sleeve 11 is provided with a pair of oppositely-disposed spiral slots 60 which extend nearly the entire length of the sleeve and which have a turn or twist of ninety degrees. That is, the ends of the same slot 60 are ninety degrees apart on the axis of the sleeve.

A collar-like member 62 is mounted for longitudinal sliding movements on sleeve 11. A pair of oppositely-arranged pins 61 are carried by sliding member 62 and project into the slots 60 respectively. The inner end of each pin 61 projects into a ring 63 having the splines 64 adapted to slide in spline grooves 65 each milled at a ninety-degree twist or angle corresponding to the twist of grooves or slots 60 in the sleeve, but in the reverse direction, so that when the sliding member 62 is moved along sleeve 11, the tendency is to turn the sleeve in one direction and shaft 51 in the reverse direction. This tendency is to turn outer eccentric 39 in one direction through the medium of pin 56 and flange 11a and to turn inner eccentric 50 (keyed to shaft 51) in the opposite direction.

Since, however, both sleeve 11 and shaft 51 are rotating in a common direction the effect of the reversely-directed slots 60 and 65 is to double the relative circumferential or rotative adjustment of the two cams or eccentrics relative to each other at each stage of the movement of slider 62 while both cams are rotating in the forward direction. In other words, only one of the eccentrics is adjusted relatively to the other, either forward or back, as they both continue to move forward during the adjustment. The effect upon ring 37 is likewise doubled or compounded at each stage of movement of slider 62.

Figure 4:
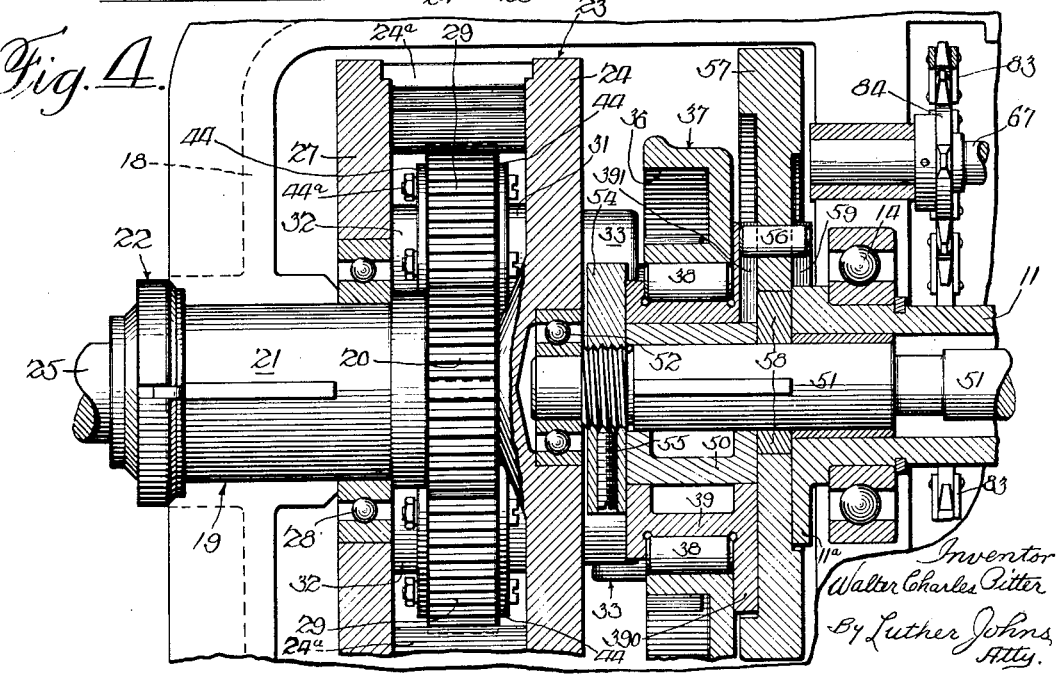
Fig. 4 is a fragmentary plan section following Fig. 1 but showing a changed position.
Figure 5:
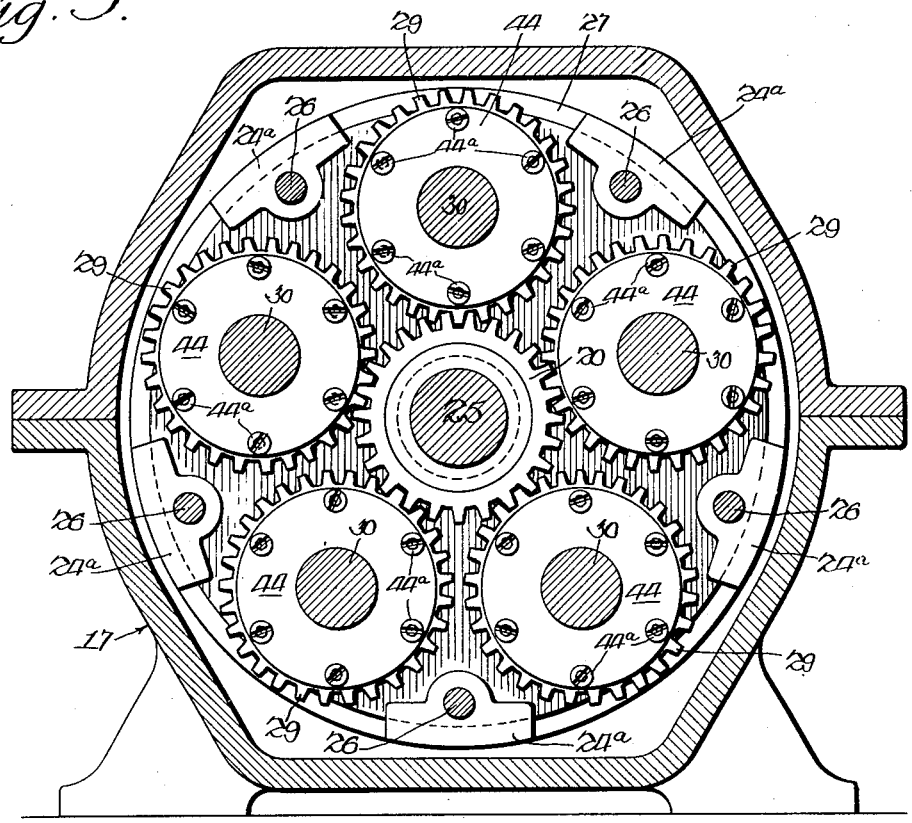
Fig. 5 is a cross section on the line 5—5 of Fig. 1.
Figures 7, 8:
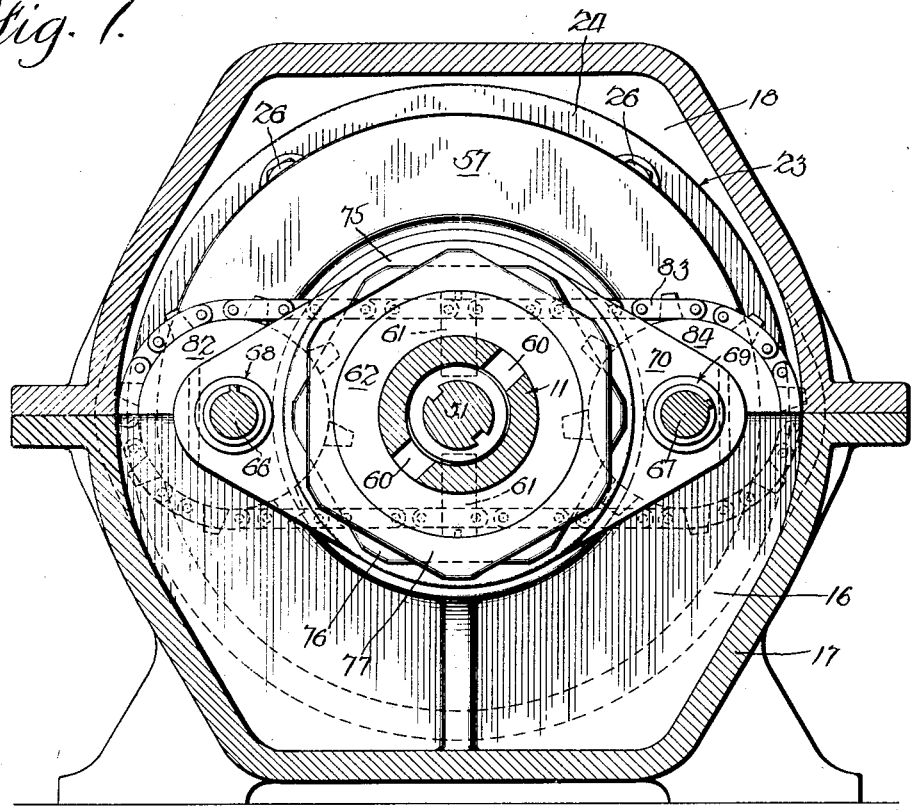
Fig. 7 is a cross section on the line 7—7 of Fig. 1.
Fig. 8 is a fragmentary detail section similar to Fig. 3, but showing operative parts in a changed position.

The total relative movement of shaft 51 and sleeve 11 is one hundred and eighty degrees, which will cause the associated parts to assume the relative positions shown in Figs. 4 and 8.

In order to move the sliding member 62 back and forth over sleeve 11 I provide a pair of threaded shafts 66 and 67 (Fig. 1) mounted in bearings in front wall 15 and in partition wall 16. A diamond-shaped plate 70 (Fig. 7) has nut elements 68 and 69 (Fig. 1) through which the screw shafts 66 and 67 respectively extend. Plate 70 has a central opening 71 through which the sliding member 62 freely extends.

Sliding member 62 has an annular flange 62a against which rests the hardened steel ring 72 which has an annular recess 72a forming a raceway in one side thereof to receive a plurality of balls 73 which bear against plate 70. A similar ring of balls 74 is held in place by ring-like plate 70 and a hardened steel ring 75. This ball bearing is adjustable and readily assembled by means of a nut 76 and lock nut 77 threaded on sliding member 62.

A hand wheel 78 (Fig. 1) outside of housing 17 is fixed to a shaft 79 having a helical gear 80, shown in dotted lines. Gear 80 meshes with gear 81 on screw shaft 66.

In order to rotate threaded shaft 67 from shaft 66 I provide sprockets 82 and 84 on shafts 66 and 67 respectively, with an endless chain 83 extending around these sprockets which are thus caused to turn in a common direction. Turning hand wheel 78 moves sliding member 62 in one direction or the other and varies the throw of the cam unit 50—39 from zero excentricity to the full throw of both cams combined.

Sliding member 62 is locked in any longitudinal position on sleeve 11 by gears 80 and 81, but this sliding member is free to turn with sleeve 11 and shaft 51 through the bearing which includes the balls 73 and 74.

Figure 1:
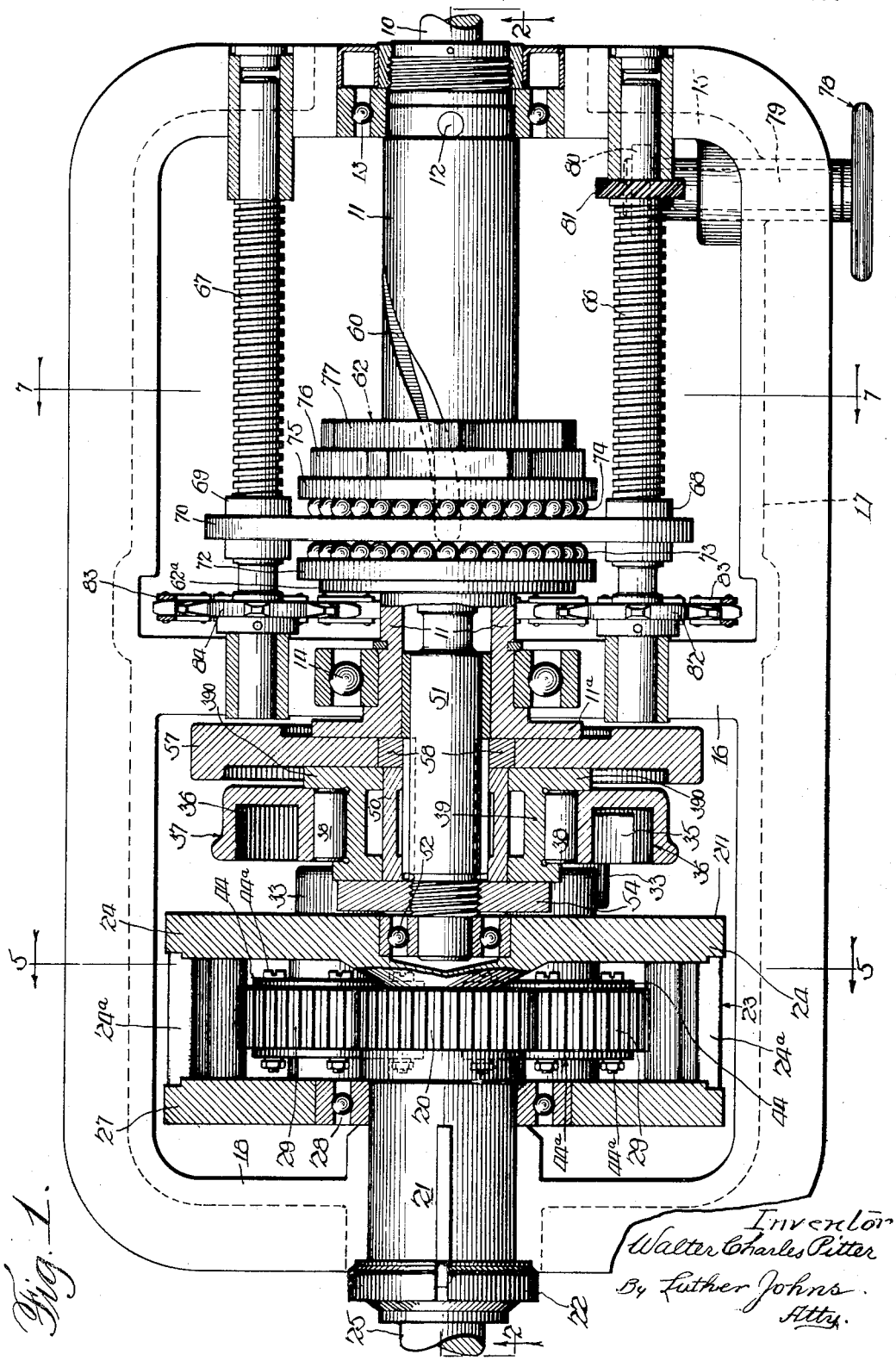

In the operation of the device, assuming the input shaft 10 to be rotating and the parts to be in the position shown in Figs. 1 and 2, sleeve 11 will be rotating with input shaft 10 and driving shaft 51 through sliding member 62 and its associated parts. Inner eccentric 50 (on shaft 51) and outer eccentric 39 (driven by sleeve 11 through pin 56) are likewise turning at the rate common to shaft 51 and sleeve 11. Ring 37 is moving excentrically with a throw or degree of excentric movement determined by the position of slider 62 which determines the relative position of eccentrics 50 and 39 to each other.

When sliding member 62 is in the extreme end position of Figs. 1 and 2 the eccentrics 50 and 39 neutralize each other and ring 37 has no excentric movement, and output shaft is not turned.

When it is desired to drive output shaft 25 hand wheel 78 is turned to move member 62 toward end wall 15. This turns eccentric 50 in one direction and eccentric 39 in the opposite direction, and ring 37 moves excentrically. This excentric movement of ring 37 rocks the crank arms 33 and clutch shafts 30. All of the crank arms are moved simultaneously, but not in the same direction. One will move in the clutching direction for a space and then the second will take up the clutching or ratcheting movement, and then the third, and so on, the first one returning in the meantime for a fresh grip upon the associated planet wheel. The arrangement is such that before one planet wheel loses its driving power upon the sun wheel another planet wheel comes into action.

The amount of throw of the crank arms depends upon the excentricity of the ring 37. Assuming the driving speed to be constant (that of cams 50 and 39 also being constant) a greater movement of the crank arms in a given space of time means a more rapid output speed. The rotor marked 23 as a whole is made to turn bodily around the sun wheel (which is fixed) and the output shaft 25 is rigid with rotor 23.

The full annular construction for groove 36 is preferable, however, as the ring is more easily made that way and through its automatic creeping movements the wear is made uniform at all places.

The counterbalance 57 is a disc-like member mounted on an eccentric 58 having the throw of inner eccentric 50 and having its high place always maintained one hundred and eighty degrees from that of eccentric 50. Counterbalance 57 and its cam 58 move together and as one element whenever the speed-selecting mechanism including sliding member 62 is not in action. Varying the output speed by moving slider 62 varies the relation of cam 58 to the counterbalance 57. Its effect is to counterbalance cams 50 and 39 and the floating ring 37.

A construction as above described employing a ring-like member 37 having an annular recess, with blocks as 35 slidable in the recess and into which blocks the crank pins are journaled, eliminates such features as connecting rods, wrist-pins, etc. which have been suggested heretofore in variable-speed transmissions.

The present construction is peculiarly simple and peculiarly strong and durable. I may point out in this connection that my single bearing 38 between the eccentric unit 50—39 takes the place of five connecting-rod bearings arranged side by side. The device in this respect and in others peculiarly compact and of relatively few parts. The construction is also notably efficient in power output. The device is also smooth-running.

The drawings are substantially to scale.

I contemplate as being included in these improvements all such changes, variations and departures from what is thus specifically illustrated and described as fall within the scope of the appended claims.

I claim:

1. A variable speed transmission mechanism comprising in combination an inner eccentric, an outer eccentric on the inner eccentric and on the axis thereof, means for rotating both of said eccentrics at the same speed whereby they operate as a unit, said eccentrics being mounted whereby at least one of them may be turned adjustable relatively to the other thereof to vary the excentricity of the two cams as a unit, manually-controlled means for turning at least one of said eccentrics relative to the other thereof to vary the excentricity of the two cams as a unit, a power-transmitting ring having a plurality of arcuately-arranged seats therein for slidable blocks, a block slidable in each of said seats, said ring being mounted on said outer cam to move with all of the varying degrees of excentricity provided by the various adjustment relations between the two eccentrics, a fixed sun gear on the axis of the two eccentrics, a rotor on the same axis, an output shaft in driven relation to said rotor, parallel shafts carried by the rotor, planet gears severally in mesh with the sun gear and mounted on said shafts carried by the rotor, each of said planet gears and its associated shaft carried by the rotor having an associated one-way clutch device, each of said shafts carried by the rotor having a crank arm and said crank arms being pivotally connected to said blocks respectively, the arrangement providing that as said ring is moved excentrically said shafts carried by the rotor are rocked back and forth and said clutch devices transmit step-by-step movements to the planet gears respectively and in a common direction.

2. In regulating means for change speed gears of that type in which an eccentric adjustably mounted in respect of a driving shaft actuates planetary gears in driving relation to a driven shaft, the combination of a sleeve rotatable on the driving shaft, a pin projecting from said sleeve and slidable thereon, the said eccentric having a groove into which said pin projects and means for rotating said sleeve relatively to the driving shaft for adjusting said eccentric.

3. In regulating means for change speed gears of that type in which an eccentric adjustably mounted in respect of a driving shaft actuates planetary gears associated with a driven shaft, the combination of a sleeve rotatable on the driving shaft, a pin projecting from said sleeve and radially slidable thereon, the said eccentric having a rectilinear groove into which said pin projects, and means for rotating said sleeve relatively to the driving shaft for adjusting said eccentric.

4. In regulating means for change speed gears of that type in which an eccentric adjustably mounted in respect of a driving shaft actuates planetary gears associated with a driven shaft, the combination of a sleeve rotatable on the driving shaft, said sleeve having a radial slot, a pin projecting into said slot, the eccentric having a groove extending radially with respect to the driven shaft, and into which said pin projects, and means for rotating said sleeve relatively to the driving shaft.

5. In regulating means for change speed gears of that type in which an eccentric adjustably mounted in respect of a driving shaft actuates planetary gears associated with a driven shaft, the combination of a sleeve rotatable on the driving shaft, a pin rotated by said sleeve, the eccentric having a groove into which said pin projects, a pin supporting element between said sleeve and eccentric, said pin supporting element being movable relatively to said sleeve.

6. In regulating means for change speed gears of that type in which an eccentric adjustably mounted in respect of a driving shaft actuates planetary gears associated with a driven shaft, the combination of a sleeve rotatably adjustable on the driving shaft, and second eccentric mounted on the driving shaft between said first named eccentric and said sleeve, a disc rotatably supported on said second eccentric, said first named eccentric and said sleeve being provided with grooves, a pin projecting from said disc into each of said grooves, and means for rotating said sleeve relatively to the driving shaft.

7. In regulating means for change speed gears of that type in which an eccentric adjustably mounted in respect of a driving shaft actuates planetary gears associated with a driven shaft, the combination of a sleeve rotatable on the driving shaft, a pin radially movable relatively to said sleeve and projecting therefrom into a radial groove of the eccentric, a pin supporting element between said sleeve and said eccentric, and a second eccentric on which said pin supporting element is movable, said second eccentric being fixed to the driving shaft.

8. In regulating means for change speed gears of that type in which an eccentric adjustably mounted in respect of a driving shaft actuates planetary gears associated with a driven shaft, the combination of a sleeve rotatable on the driven shaft, an adjusting element for said eccentric operable by rotation of said sleeve, and means for effecting radial displacement of said adjusting element relatively to said sleeve and to said eccentric upon rotation of said sleeve.

9. In regulating means for change speed gears of that type in which an eccentric adjustably mounted in respect of a driving shaft actuates planetary gears associated with a driven shaft, the combination of a sleeve rotatable on the driving shaft, a pin rotatable with said sleeve about the axis of said driving shaft and connected with said eccentric to be moved thereby circumferentially of said driving shaft, and means interposed between said eccentric and said sleeve for converting the circumferential movement of said connecting pin into a radial movement relatively of said sleeve.

WALTER CHARLES PITTER.